(12) United States Patent
Webb et al.

(10) Patent No.: US 8,397,489 B2
(45) Date of Patent: Mar. 19, 2013

(54) ENGINE IDLING DURATION CONTROL

(75) Inventors: Timothy Webb, Ann Arbor, MI (US); Michiel J. Van Nieuwstadt, Ann Arbor, MI (US); John Paul Bogema, Flat Rock, MI (US); Christopher Oberski, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1225 days.

(21) Appl. No.: 12/208,212

(22) Filed: Sep. 10, 2008

(65) Prior Publication Data

US 2010/0058738 A1  Mar. 11, 2010

(51) Int. Cl.
*F01N 3/00* (2006.01)

(52) U.S. Cl. ............... 60/285; 60/274; 60/276; 60/297; 60/301

(58) Field of Classification Search ........... 60/274, 60/278, 285, 286, 295, 297, 301, 276
See application file for complete search history.

(56) References Cited

U.S. PATENT DOCUMENTS

| | | | |
|---|---|---|---|
| 5,437,153 A * | 8/1995 | Takeshima et al. | 60/276 |
| 5,976,475 A | 11/1999 | Peter-Hoblyn et al. | |
| 5,992,142 A * | 11/1999 | Pott | 60/274 |
| 6,220,019 B1 * | 4/2001 | Sugiura et al. | 60/285 |
| 6,363,771 B1 | 4/2002 | Liang et al. | |
| 6,615,579 B2 * | 9/2003 | Nishiyama | 60/285 |
| 6,993,900 B2 * | 2/2006 | Upadhyay et al. | 60/286 |
| 7,093,427 B2 | 8/2006 | Van Nieuwstadt et al. | |
| 7,246,485 B2 | 7/2007 | Ohki et al. | |
| 7,624,569 B2 * | 12/2009 | Driscoll et al. | 60/285 |
| 7,971,570 B2 * | 7/2011 | Noda | 123/339.15 |
| 2008/0022659 A1 | 1/2008 | Viola et al. | |

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

Systems and methods are described for controlling an engine in a vehicle. One example method includes, after a threshold duration of engine idling, continuing engine idle operation when an exhaust NOx sensor indicates a NOx level below a NOx threshold, and stopping engine idle and shutting down the engine when the exhaust NOx sensor indicates the NOx level is above the NOx threshold. In this way, when the exhaust emissions are below the NOx threshold, it is possible to prolong engine idling operation using the exhaust NOx sensor.

15 Claims, 4 Drawing Sheets

ENGINE IDLING DURATION CONTROL

BACKGROUND

During the operation of a diesel engine vehicle, it may be desirable to idle the engine for a prolonged period of time, for example to heat a vehicle cabin or run engine accessory devices. Diesel engines may emit NOx gases as exhaust, which are regulated by law. For example CARB 1956.8 (a) (6) mandates vehicles with gross vehicle weight rating (GVWR) greater than 14,000 lbs (6,350 kilograms) have emissions lower than 30 grams per hour while the engine is idling or the engine must shut down within 5 minutes of exceeding the limit.

Previous art has addressed the control of NOx emissions in various ways. Exhaust gas recirculation (EGR) systems and after-treatment devices may reduce emitted NOx. EGR systems may reduce emitted NOx by recirculating exhausted gases back to the engine's intake. Examples of NOx after-treatment devices include selective catalytic reduction (SCR) devices and three way catalysts (TWC). Treatment of exhaust gases by a catalyst may be carried out at or above a light-off temperature that provides the activation energy for the emission neutralizing reactions to take place. Vehicles may also employ automatic shut-down controls which turn an engine off after a predetermined time.

The inventors herein recognize difficulties with these approaches to emissions control during idling. An idling engine may produce exhaust gases that are cooler than exhaust gases produced at higher speeds and/loads. Cooler exhaust gas temperature may lead to coke formation, soot accumulation, or other contamination inside an EGR system, and may lower the temperature in after-treatment devices below light-off as well as facilitate the formation of urea deposits in a SCR device. Additionally, if an operator desires to run an engine in idle for longer than 5 minutes, then automatic shutdown controls may degrade customer satisfaction.

SUMMARY

Systems and methods are described using sensed exhaust data to control engine idle operation. In one method, after a threshold duration of engine idling, engine idle operation continues when an exhaust NOx sensor indicates a NOx level below a NOx threshold, and engine idle stops and the engine shuts down, possibly after a selected duration, when the exhaust NOx sensor indicates the NOx level is above the NOx threshold.

In this way, when the exhaust emissions are below the threshold, it is possible to prolong engine idling operation using the NOx sensor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE FIGURES

Figure 1:
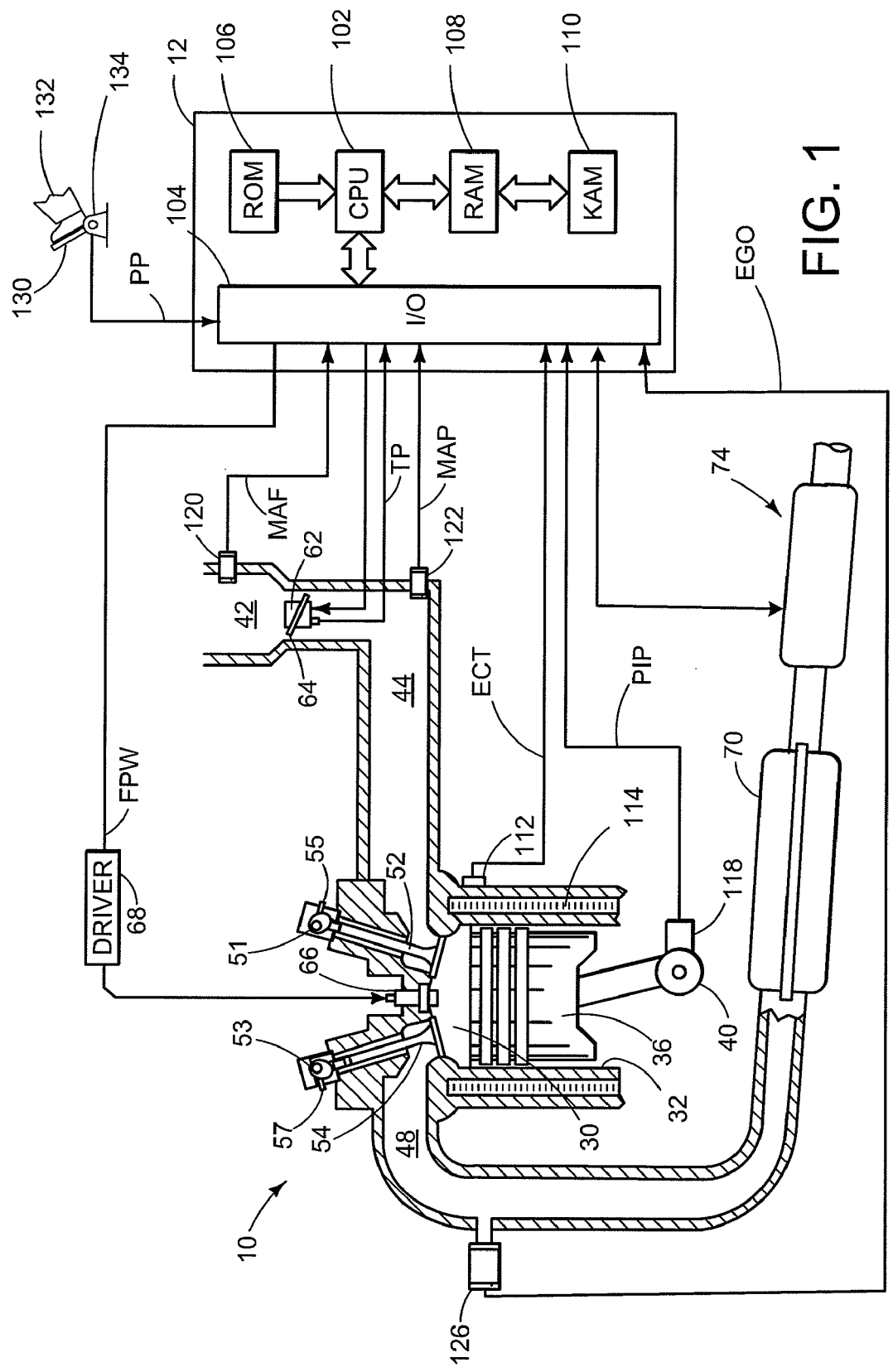
FIG. 1 shows an exemplary embodiment of an internal combustion engine and control system.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be an SCR catalyst, a NOx trap, an oxidation catalyst, various other emission control devices, or combinations thereof. A second emission control system 74 is shown in communication with device 70. Controller 12 is configured to control emission control system. This feature is described in more detail below.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP.

Storage medium read-only memory 106 can be programmed with computer readable data representing instructions executable by processor 102 for performing the methods described below as well as other variants that are anticipated but not specifically listed.

Further, in the disclosed embodiments, an exhaust gas recirculation (EGR) system (not shown) may route a desired portion of exhaust gas from exhaust passage 48 to intake passage 44 via an EGR passage. The amount of EGR provided to intake passage 48 may be varied by controller 12 via an EGR valve. Further, an EGR sensor may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing.

Engine 10 may further include a compression device (not shown) such as a turbocharger or supercharger including at least a compressor arranged along intake manifold 44. For a turbocharger, the compressor may be at least partially driven by a turbine (e.g. via a shaft) arranged along exhaust passage 48. For a supercharger, the compressor may be at least partially driven by the engine and/or an electric machine, and may not include a turbine. Thus, the amount of compression provided to one or more cylinders of the engine via a turbocharger or supercharger may be varied by controller 12.

As described above, FIG. 1 shows only one cylinder of a multi-cylinder engine, and that each cylinder may similarly include its own set of intake/exhaust valves, fuel injector, spark plug, etc.

Figure 2:
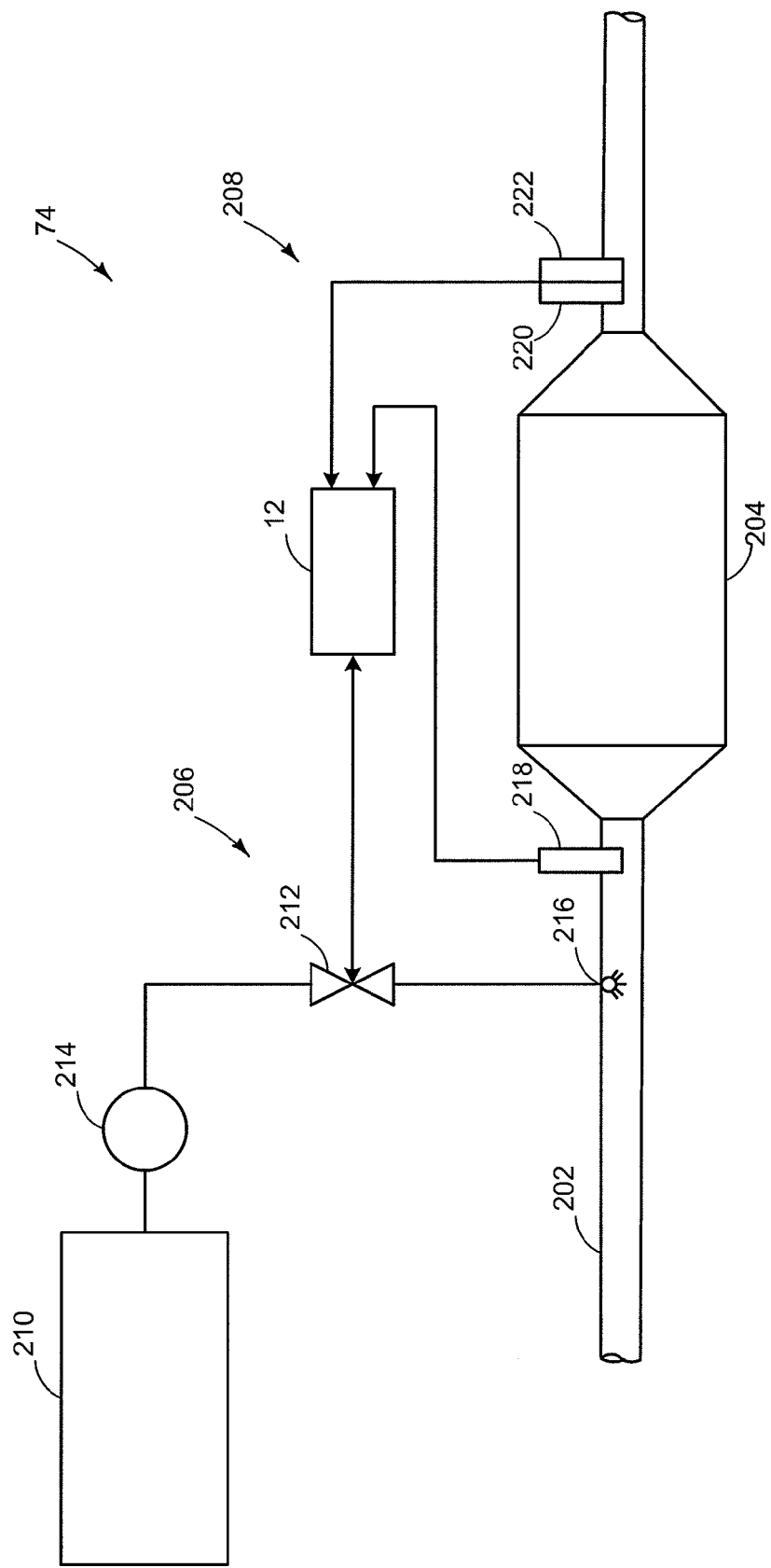
FIG. 2 shows an exemplary embodiment of an emission control system.

FIG. 2 shows an illustration of an example of emissions control system 74. The emissions control system is shown coupled to an exhaust system 202 at a location upstream of device 70 (shown in FIG. 1), such as a diesel oxidation catalyst. In alternate examples, FIG. 2 is an illustration of an example of emissions control system 70. Further, the emission control system may generally include a SCR catalyst 204, an injection system 206, and a control system 208. In addition, the emission control diagnostic system may include a diesel particulate filter (not shown).

SCR catalyst 204 may facilitate the reduction of NOx in the exhaust from engine 10 by a reagent. In some embodiments, the reductant may be liquid urea. In particular, NOx from the exhaust system reacting with urea in the SCR catalyst may form more environmentally benign products such as nitrogen, carbon dioxide, and water for emission into the atmosphere. Some exemplary SCR reactions are as follows.

First, urea added to exhaust system 202 may decompose into ammonia as follows:

$$CO(NH_2)_2 \rightarrow NH_3 + HNCO$$

$$HNCO + H_2O \rightarrow NH_3 + CO_2$$

Ammonia may, in turn, react with NOx in the SCR catalyst according to various different reaction pathways including, but not limited to, one or more of the following:

$$4NO + 4NH_3 + O_2 \rightarrow 4N_2 + 6H_2O$$

$$2NO_2 + 4NH_3 + O_2 \rightarrow 3N_2 + 6H_2O$$

$$6NO_2 + 8NH_3 + \rightarrow 7N_2 + 12H_2O$$

$$NO + NO_2 + 2NH_3 \rightarrow 2N_2 + 3H_2O$$

It may be desirable to introduce an amount of urea to the exhaust system generally derived from the above NOx reduction reaction stoichiometries or a look-up table stored in controller 12. In particular, the amount of urea introduced to exhaust system 202 may be based on information from one or more sensors. For example, the output signal from a sensor, such as exhaust gas manifold sensor 126 shown in FIG. 1, may indicate an amount of NOx in the exhaust. As such, controller 12 may prompt injection system 206 to introduce an amount of urea to the exhaust system accordingly where the amount of urea injected may be expected to substantially consume the urea and convert a substantial portion of the NOx. Further, a minimum conversion efficiency may be selected to define acceptable performance of the emission control system such that NOx may be substantially removed from the exhaust.

Injection system 206 may store and/or supply a reductant to the SCR catalyst. In some embodiments, the injection system may include a reductant storage device 210 containing liquid urea. Further, the injection system may include ancillary components to supply the urea to exhaust system, such as supply pump 214, reductant valve 212, and nozzle 216, for example. Under some conditions, the reductant valve may be configured to facilitate an amount of urea from the reductant storage device to be transported by the supply pump through the nozzle into the exhaust system coupled to the SCR catalyst. For example, controller 12 may prompt an amount of urea to be injected corresponding to the amount of NOx leaving engine 10 as detected by sensor 126 (not shown in FIG. 2) so as to substantially consume the urea and reduce the NOx in the exhaust. However, under other conditions, the amount of urea injected may be adjusted to be different from the amount determined to substantially consume urea and reduce NOx.

Figure 3:
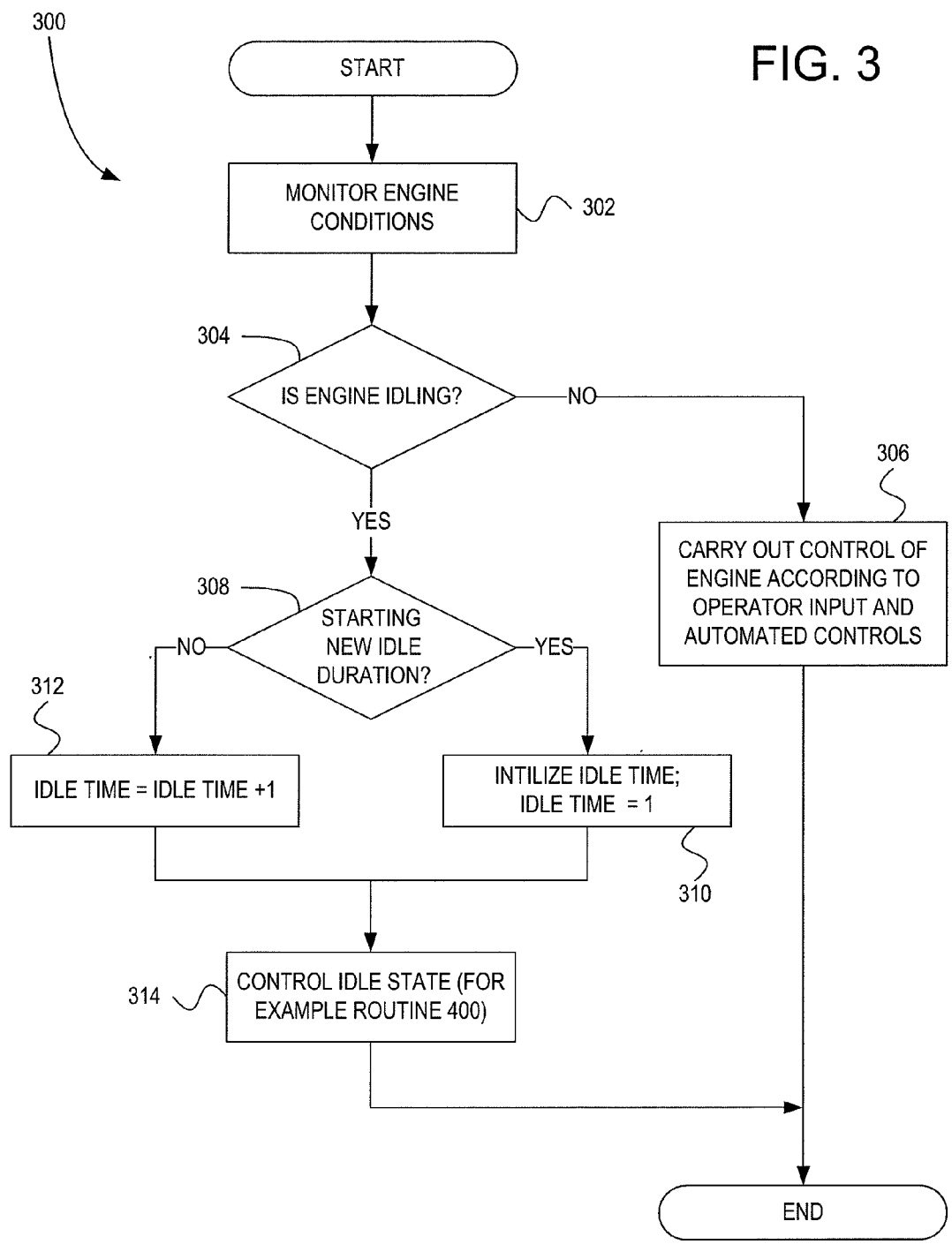
FIG. 3 shows a flowchart representing a routine for monitoring engine operating conditions and enabling engine idle control.

Referring now to FIG. 3, a flowchart illustrates a routine for monitoring engine conditions that enables idle control. One feature included in the routine is its ability to track durations of time, such as idle times. The routine may be carried out in an engine system such as engine system 10 via engine controller 12.

The routine beings at 302, which includes a process of monitoring engine operating conditions of running engine 10. Monitoring engine operating conditions may include sensing, as well as storing, data representative of exhaust composition, engine speed, throttle position, valve timing, etc.

The routine may continue to 304, which includes a determination of whether the engine is idling. Determining if the engine is in idle may involve comparing monitored engine system data, such as signals from an operator (e.g., when the pedal is un-actuated), engine speed, exhaust composition, and vehicle speed. In some examples, monitored engine system data may be compared to average operating data. In other examples, monitored engine system data may be compared to previous engine data. In still further examples, monitored engine system data may be compared to stored data in a look-up table or other controller memory. In the present embodiment, the controller may compare monitored engine system data with another data set to determine if the engine is idling.

When the engine is not idling, the routine may continue to 306, which includes a process for carrying out control of the engine according to operator input and automated controls. Operator input may be signals from one or more devices (for example signal PP). Automated engine controls may include routines for controlling throttle position, valve timing, fuel injection and EGR systems, and may further include controlling engine output responsive to the operator input (PP). Further, the reductant injection system 206 may be operated to delivery (e.g., inject) reductant into the exhaust based on engine speed, engine load, operator demand, temperature, and various additional operating parameters. In one particular example, a significant amount of injected reductant may be stored in the SCR catalyst.

In some alternate embodiments, process 306 is proceeded or preceded by a process of setting a variable in the controller's memory, idle time, to a valve, for example 0. In alternate embodiments, such as the present one, this process is absent.

If the routine determines that the engine is idling, then the routine may continue to 308 where the routine determines if the engine is starting a new idle duration. In some examples, the determination may involve checking information stored in a look-up table in the controller's memory to determine if the engine is continuing idle operation, or has just entered idle speed control operation. In still further embodiments, the determination may be done based on the value of the variable idle time. For example if idle time is greater than 0, then the idle is continuing idle and if idle time is equal to 0, then the engine is entering a new duration of idling.

In the case where a new engine idle duration is starting, the routine continues to 310, which includes a process of initializing the value of variable idle time. Taking an initial value enables the controller to keep track of the duration of time that the engine exists in an idle state. In the present embodiment, idle time is set equal to 1. In alternate embodiments, idle time may take another value when initialized.

In the case where engine idle duration is continuing, the routine continues to 312. At 312, the variable idle time may be incrementally increased. In the present embodiment, idle time is incrementally increased by one integer value. In alternate embodiments, another metric may be used, for example a floating point number, or a sample time of the control routine. In this way, the amount of time the engine spends in idle may be tracked. This is but one way in which the routine can monitor a duration of continuous idling operation.

Next, in the present embodiment, regardless of whether the routine carries out process 310 or 312, the routine continues to 314. At 314, the controller may carry out idle control of the engine. Idle control may include monitoring emissions, adjusting engine operating conditions, such as valve lift and timing, throttle position and fuel injection. Further, idle operation may include idle speed control, where fuel injection may be adjusted responsive to deviations in actual speed from a desired idle speed. In some examples, idle control is carried out by calling other routines or sub-routines, which may include, for example, routine 400. After 314, the routine ends.

Figure 4:
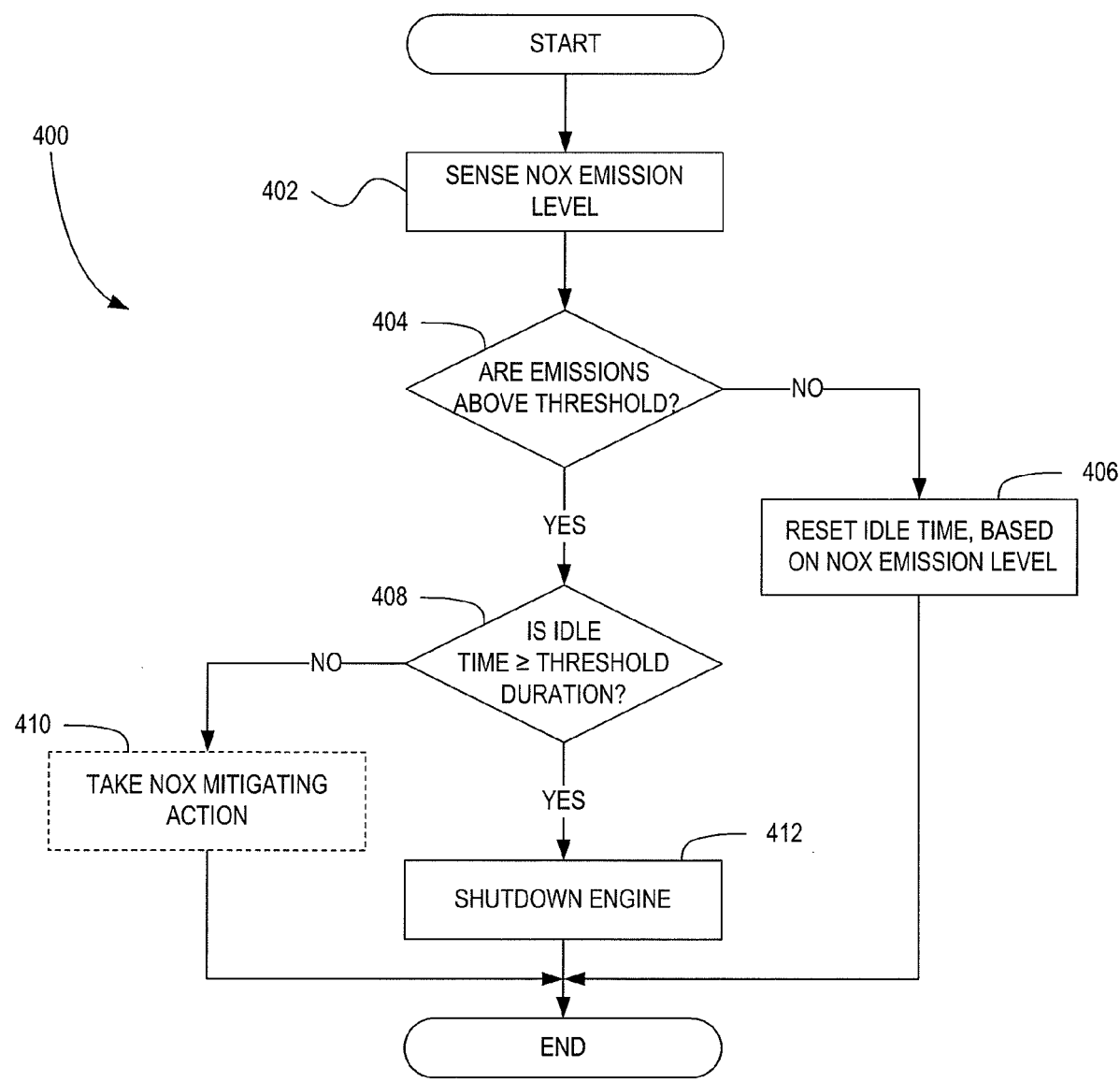
FIG. 4 shows a flowchart representing a routine for using exhaust sensor data to control engine idle operation.

Referring now to FIG. 4, a flowchart shows a routine 300 for using sensed exhaust data to control engine idle operation. The routine may be carried out in an engine system such as engine system 10 via engine controller 12. The engine may be in an idle state and the controller may time the duration that the engine idles. A threshold duration may be stored in the controller's memory to be used in the routine. In one example, the threshold duration is 5 minutes. In other examples, the threshold duration for an idling engine may be greater than, or less than, 5 minutes. A variable idle time may also be stored in the controller's memory to be used in the routine, and may contain information about the duration that the engine has been in an idle state. Idle time may contain information stored by the controller in previous routines (for example routine 300).

The routine may start at 402, where NOx emissions are sensed. Sensing NOx emissions may include reading an output of a NOx sensor downstream of a SCR device, for example NOx sensor 220. After the NOx emission level is sensed, the routine continues with a determination 404 of whether the sensed emissions are above a prescribed level. This prescribed level may be a threshold NOx emissions level, an emissions threshold, a predetermined threshold, a NOx level, NOx level threshold, or NOx rate. The threshold may be 30 grams per hour or it may be some other rate of NOx emission release, or amount of NOx. If the sensed emission level is not above the NOx level threshold, the routine proceeds to 406, otherwise it continues to determination 408.

In some embodiments, such as those without a NOx sensor, the routine may estimate whether emissions are above the emissions threshold based on an amount of reductant stored in the SCR catalyst before idle conditions were entered (e.g., an amount of reductant during operation with non-idling conditions). For example, reductant stored in the SCR catalyst during non-idling conditions may provide for prolonged NOx reduction at idle conditions, thereby enabling operation below the threshold level of NOx emissions at idle. While it may also be possible to further inject urea during idle conditions, such operation may provide degraded operation in some temperature ranges due to the difficulty in actually storing reductant on the SCR catalyst under such conditions.

As such, when the system enters idling conditions, a prolonged idle operation may be provided, responsive to the level of reductant already stored in the SCR catalyst upon the entering of idle conditions. For example, when entering idling operation with a greater amount of already stored reductant in the SCR catalyst, a longer idling operation with emissions below the threshold may be provided before a shutdown than when entering idling with a lower amount of already stored reductant.

Similar modifications may be used based on other parameters, such as catalyst temperature. As such, emissions during idling may be below the emissions threshold for a longer duration than when entering idling with a higher SCR catalyst temperature, than when entering idling conditions with a lower SCR catalyst temperature. Therefore, such parameters may also be used in place of, or in addition to, NOx emissions sensed by the NOx sensor.

In some embodiments, the routine continues to 406 to reset or adjust the variable idle time based on the NOx emission level. In some examples, idle time is reinitialized by setting the value of idle time equal to 1. In other examples, idle time is set to another value to indicate that engine operation may continue without the engine emitting NOx emissions above the NOx level threshold for longer than the threshold duration.

In this way, the total duration of engine idle operation emitting NOx emissions below the threshold level may be extended by resetting idle time by a variable amount, the variable amount depending on the NOx emissions relative to the threshold of 404. For example, if the emissions are maintained only slightly below the threshold, the idle duration may be reset to a relatively high valve, whereas if the emissions are maintained significantly below the threshold, the idle duration may be reset to a relatively low value closer to zero.

Once process 406 has ended, the routine may end.

In some examples, the routine proceeds from determination 404 to determination 408. At 408, the routine determines whether the threshold duration has passed. For example, the routine may determine that the engine has been emitting NOx emissions above the threshold level for longer than the threshold duration. In some examples, this may be done by comparing the value of the variable idle time with the value of the threshold duration. In other examples, the determination is carried out in another fashion.

If the engine has not been idling for longer than the threshold duration, and the engine is emitting NOx emissions above the threshold value, then the routine may continue to 410 to take one or more NOx mitigating actions. Block 410 is dashed to indicate that in some embodiments, 410 may be absent. The NOx mitigating actions may include adjusting engine speed. For example, increasing engine speed may be used to increase temperature of engine exhaust, which may in turn heat NOx after treatment device and thereby reduce emissions below the threshold. Alternatively, decreasing engine speed may lower the rate of exhaust produced. In this way the rate of NOx emissions may be reduced.

Other example NOx mitigating actions may include heating one or more NOx after treatment devices. In one example, the exhaust system may include a fuel heater to increase temperature of the NOx after treatment device. In other examples, heating a NOx after treatment device may be done by electric resistive heating. Heating a NOx after treatment device may increase its efficiency and thereby lower NOx emissions. Still a further example of a NOx mitigating action is enabling or increasing the use of an exhaust gas recirculation (EGR) system. Enabling exhaust gas recirculation may include opening or closing an exhaust throttle to allow for increased airflow through the EGR system. In still further alternate examples, a turbocharger may enabled by an action to mitigate NOx emissions. Once the NOx mitigating action process 410 is carried out the routine may end.

If at 408 the routine decides that the engine has idled longer than the threshold duration, then it may continue to 412, which includes engine shutdown. Engine shut down may include stopping injection and subsequently combustion in the engine. Once this process is carried out, the routine may end.

By monitoring NOx emissions during idling, and tracking the emission levels with idle time, it is possible to selectively shut-down engine operation after a prescribed duration when mitigating action is unable to maintain NOx emissions below a threshold. Likewise, it is possible to take the mitigating actions only when emissions are above the threshold duration such that an engine shut-down would otherwise be scheduled. As such, the system can selectively maintain engine idle operation responsive to the NOx emissions for longer than the threshold time when emissions can be maintained below the threshold.

Specifically, in one example, the above routines may include a method for controlling engine 10 that includes after a threshold duration of engine idling, continuing engine idle operation when an exhaust NOx sensor indicates a NOx level below a NOx threshold, and stopping engine idle and shutting down the engine when the exhaust NOx sensor indicates the NOx level is above the NOx threshold. Further, the method may include continuing engine idle operation when the exhaust NOx sensor indicates a NOx level below the NOx threshold, and starting a measurement of engine idle duration for comparison to said threshold duration.

However, to maintain emissions below the threshold, the engine may take various mitigating actions when the exhaust NOx sensor indicates the NOx level is above said threshold as noted herein, including: increasing or decreasing engine speed; heating a selective catalytic reduction (SCR) device downstream of said engine; increasing exhaust flow of an exhaust gas recirculation device (EGR); injecting urea from a storage unit into a selective catalytic reduction (SCR) device to reduce emissions in response to when said exhaust NOx sensor indicates said NOx level is above said threshold.

Thus, in one example, the NOx mitigating actions may include speeding up the engine to enable the production of hotter exhaust gases. In this way, coke formation in EGR systems and urea formation in SRC systems may be reduced, and temperatures above light-off may be maintained in aftertreatment devices. In a further embodiment, NOx mitigating actions may involve the resistive heating of one or more NOx after treatment devices, such as a SCR device.

In another example, the NOx mitigating actions may include slowing down the engine to lower the production of exhaust. Lowering the overall rate of exhaust production may reduce the rate of emissions produced. Still further examples of mitigating actions may include increasing EGR flow and/or adjusting turbocharger boosting operation.

Finally, as noted above, in the example of an SCR emission system, reductant (e.g., ammonia) may be stored on the SCR catalyst and enable the reduction of NOx generated, even during extended idling conditions where temperature of the SCR catalyst drops to below a threshold operating temperature. In this way, by taking advantage of the previous engine non-idling conditions in which reductant was injected onto the SCR catalyst, a decision to automatically shutdown the engine may be delayed and carried out after a prolonged idling operation in which the stored reductant is depleted.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine in a vehicle, comprising each of:
    after a threshold duration of engine idling, continuing engine idle operation when an exhaust NOx sensor indicates a NOx level below a NOx threshold, and stopping engine idle and shutting down the engine when the exhaust NOx sensor indicates the NOx level is above the NOx threshold, the exhaust NOx sensor positioned in an exhaust passage downstream of an emission control device; and adjusting engine operation to take mitigating action during idling to reduce NOx emissions below the NOx threshold in response to the exhaust NOx sensor indication that the NOx level is above the threshold.

2. The method of claim 1 further comprising:
    continuing engine idle operation and starting a measurement of engine idle duration for comparison to said threshold duration when the exhaust NOx sensor indicates the NOx level is below the NOx threshold.

3. The method of claim 2 where the mitigating action includes increasing or decreasing engine speed when said exhaust NOx sensor indicates said NOx level is above said NOx threshold.

4. The method of claim 2 where the mitigating action includes heating a selective catalytic reduction (SCR) device downstream of said engine when said exhaust NOx sensor indicates said NOx level is above said NOx threshold.

5. The method of claim 2 where the mitigating action includes increasing exhaust flow of an exhaust gas recirculation device (EGR) in response to when said exhaust NOx sensor indicates said NOx level is above said NOx threshold.

6. The method of claim 2 where the mitigating action includes injecting urea from a storage unit into a selective catalytic reduction (SCR) device to reduce emissions in response to when said exhaust NOx sensor indicates said NOx level is above said NOx threshold.

7. The method of claim 1 wherein said NOx threshold is 30 grams per hour.

8. The method of claim 2 wherein said threshold duration is 5 minutes, the method further comprising adjusting engine operation in response to NOx emissions emitted above the NOx threshold, and continuing to run the engine in idle after the threshold duration if said adjusting engine operation reduces emitted NOx emissions below the NOx threshold.

9. A method comprising:
    during a first operating mode, shutting down a diesel engine from idle after a threshold duration of idling operation when exhaust NOx emissions are above a threshold value; and
    during a second operating mode, continuing to run the diesel engine in idle after the threshold duration when: NOx mitigating actions responsive to increased NOx emissions reduce NOx emissions to below the threshold value, and when NOx emissions are below the threshold.

10. The method of claim 9 wherein said threshold value is at least 30 grams per hour.

11. The method of claim 10 wherein said threshold duration is 5 minutes, the method further comprising adjusting engine operation in response to NOx emissions emitted above the threshold value, and continuing to run the diesel engine in idle after the threshold duration if said adjusting engine operation reduces emitted NOx emissions below the threshold value.

12. The method of claim 9 where an amount of reductant stored in an SCR catalyst of the diesel engine upon entering idling operation is greater in the second operating mode than compared with the first operating mode.

13. The method of claim 12 further comprising delivering reductant to the SCR catalyst during at least non-idling conditions.

14. The method of claim 9 where a temperature of an SCR catalyst of the diesel engine upon entering idling operation is greater in the second mode than compared with the first mode.

15. A system in a vehicle comprising:
    a diesel engine having an exhaust;
    at least an SCR catalyst coupled to said exhaust downstream of said engine;
    a reductant delivery system coupled to said exhaust and configured to deliver reductant to the SCR catalyst;
    an exhaust NOx sensor coupled to said exhaust downstream of at least one NOx mitigating device; and
    a control system configured to deliver reductant to the SCR catalyst at least during non-idling conditions, monitor a duration of continuous engine idling, and during the duration of continuous engine idling, continue engine idle operation when the exhaust NOx sensor indicates a NOx level below a threshold, and shutting down the engine when the exhaust NOx sensor indicates the NOx level is above the threshold and when the monitored duration of continuous idling at NOx levels above the threshold is greater than a threshold duration, the control system further configured to adjust engine operation to take mitigating action to reduce NOx emissions below the threshold in response to the NOx exhaust sensor indication that the NOx level is above the threshold.

* * * * *